United States Patent
Mackey et al.

(10) Patent No.: US 11,960,822 B2
(45) Date of Patent: Apr. 16, 2024

(54) SUGGESTION OF COMMUNICATION STYLES PERSONALIZED TO TARGET AUDIENCE IN A TEXT EDITOR

(71) Applicant: Grammarly, Inc., San Francisco, CA (US)

(72) Inventors: Ben Mackey, San Francisco, CA (US); Michail Golokolosenko, San Francisco, CA (US); Nikolai Oudalov, San Francisco, CA (US); Volodymyr Nykytiuk, San Francisco, CA (US)

(73) Assignee: Grammarly, Inc., San Francisco, CA (US)

( * ) Notice: Subject to any disclaimer, the term of this patent is extended or adjusted under 35 U.S.C. 154(b) by 4 days.

(21) Appl. No.: 17/749,883

(22) Filed: May 20, 2022

(65) Prior Publication Data
US 2023/0297766 A1    Sep. 21, 2023

Related U.S. Application Data

(60) Provisional application No. 63/321,220, filed on Mar. 18, 2022.

(51) Int. Cl.
*G06F 40/166*  (2020.01)
*G06F 16/35*   (2019.01)

(52) U.S. Cl.
CPC ............ *G06F 40/166* (2020.01); *G06F 16/35* (2019.01)

(58) Field of Classification Search
CPC .................................................. G06F 40/166
See application file for complete search history.

(56) References Cited

U.S. PATENT DOCUMENTS

| | | |
|---|---|---|
| 10,872,062 B2 | 12/2020 | Truong et al. |
| 10,922,483 B1 | 2/2021 | Shevchenko et al. |
| 11,361,151 B1 | 6/2022 | Guberman et al. |
| 2018/0351901 A1 | 12/2018 | Snider et al. |
| 2021/0312122 A1* | 10/2021 | O'Donncha et al. ........ G06F 40/205 |

(Continued)

OTHER PUBLICATIONS

Anonymous, Google Cloud, "Dataflow" https://cloud.google.com/dataflow, retrieved Mar. 22, 2023, 16 pages.

(Continued)

*Primary Examiner* — James J Debrow
(74) *Attorney, Agent, or Firm* — Baker Botts L.L.P.

(57) ABSTRACT

A computer-implemented process is programmed to programmatically receive at a first computer a digital electronic object including a source text that is directed to a target audience and that was composed at a second computer, determine a style value specifying a particular communication style from among different communication styles based on a communication profile of the target audience, evaluate the source text using a trained machine-learning model, receive a classification output from the machine-learning model, generate an output set of suggested edits to the source text based on comparing the classification output to the source text, and transmit the output set of suggested edits to the second computer. The classification output from the machine-learning model includes a modified text based on the source text. The modified text has been classified using the particular communication style specified in the style value.

20 Claims, 7 Drawing Sheets

(56) References Cited

U.S. PATENT DOCUMENTS

| | | | |
|---|---|---|---|
| 2021/0334708 A1* | 10/2021 | Li et al. | G06N 20/20 |
| 2023/0066233 A1* | 3/2023 | Van Dam et al. | G06F 40/289 |
| 2023/0123574 A1 | 4/2023 | Guberman et al. | |
| 2023/0245651 A1* | 8/2023 | Wang | G10L 15/1815 |

OTHER PUBLICATIONS

Anonymous, "Introduction to TensorFlow" https://www.tensorflow.org/learn, retrieved Mar. 22, 2023, 9 pages.

Grammarly, Inc. "How Grammarly's Product Works" https://www.grammarly.com/how-grammarly-works, retrieved Mar. 22, 2023, 11 pages.

Facebook Inc. "Text classification" https://fasttext.cc/docs/en/supervised-tutorial.html, retrieved Apr. 11, 2023, 11 pages.

Facebook Inc. "Word representations" https://fasttext.cc/docs/en/unsupervised-tutorial.html, retrieved Apr. 11, 2023, 11 pages.

International Searching Authority, International Search Report and Written Opinion for International Application No. PCT/US23/15007, dated Jun. 2, 2023, 8 pages.

* cited by examiner

300

Communication Profile

To understand you a bit better, we're going to ask you a series of questions to refine your communication preferences.

2/3 On the receiving end at work, how long or short do you like information to be presented? ← 310

| Typically, I like things short and brief. | ← 320 |

| I prefer receiving information to be as descriptive as possible. | ← 330 |

| I'm not really sure. | ← 340 |

< Back

*FIG. 3*

*FIG. 5B*

SUGGESTION OF COMMUNICATION STYLES PERSONALIZED TO TARGET AUDIENCE IN A TEXT EDITOR

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2020-2021 Grammarly, Inc.

BENEFIT CLAIM

This application claims the benefit under 35 U.S.C. § 119(e) of provisional application 63/321,220, filed 18 Mar. 2022, the entire contents of which is hereby incorporated herein by reference for all purposes as if fully set forth herein.

TECHNICAL FIELD

One technical field of the present disclosure is computer-implemented natural language processing. Another technical field is natural language text addition, modification or suggestion. The suggested CPC classification is G06F40/40 and G06N5/04.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer-supported communications increasingly occur asynchronously through messaging or electronic mail (email). Particularly in work environments, people are also building relationships and getting jobs done via messaging or emails. One problem that people are facing with communications via messaging or emails is that such communications may impede productivity or the ability to deliver on their own promises and objectives. For example, some people may lack the ability to clearly communicate their needs to another person, by not providing enough context, action items, or deadlines, or sending messages or emails to someone who is completely overloaded which may inappropriate. As another example, some people may experience anxiety in drafting communications if they do not know the target audience.

Computer-assisted text processing tools such as grammar checkers and spell checkers are available. However, some such tools do not execute in real-time as a text is being drafted but require a separate scanning and suggestion stage. Or, the available tools cannot customize a particular text for any of several different recipients or groups.

Based on the foregoing, there is an acute need in the relevant technical fields for a computer-implemented, high-speed online system with real-time response capable of inspecting a draft text and suggesting alternative text that improves or supplements the original text automatically with respect to a particular target recipient or group. There also is a need to provide text processing in a manner that makes it more effective in helping individuals in a team context to build relationship and get their work done.

SUMMARY

The appended claims may serve as a summary of the invention.

BRIEF DESCRIPTION OF THE DRAWINGS

In the drawings:

FIG. 3 illustrates an example of a graphical user interface that may be programmed to assist a user to set up a communication profile.

Each of FIG. 5A

DETAILED DESCRIPTION

Figure 1:
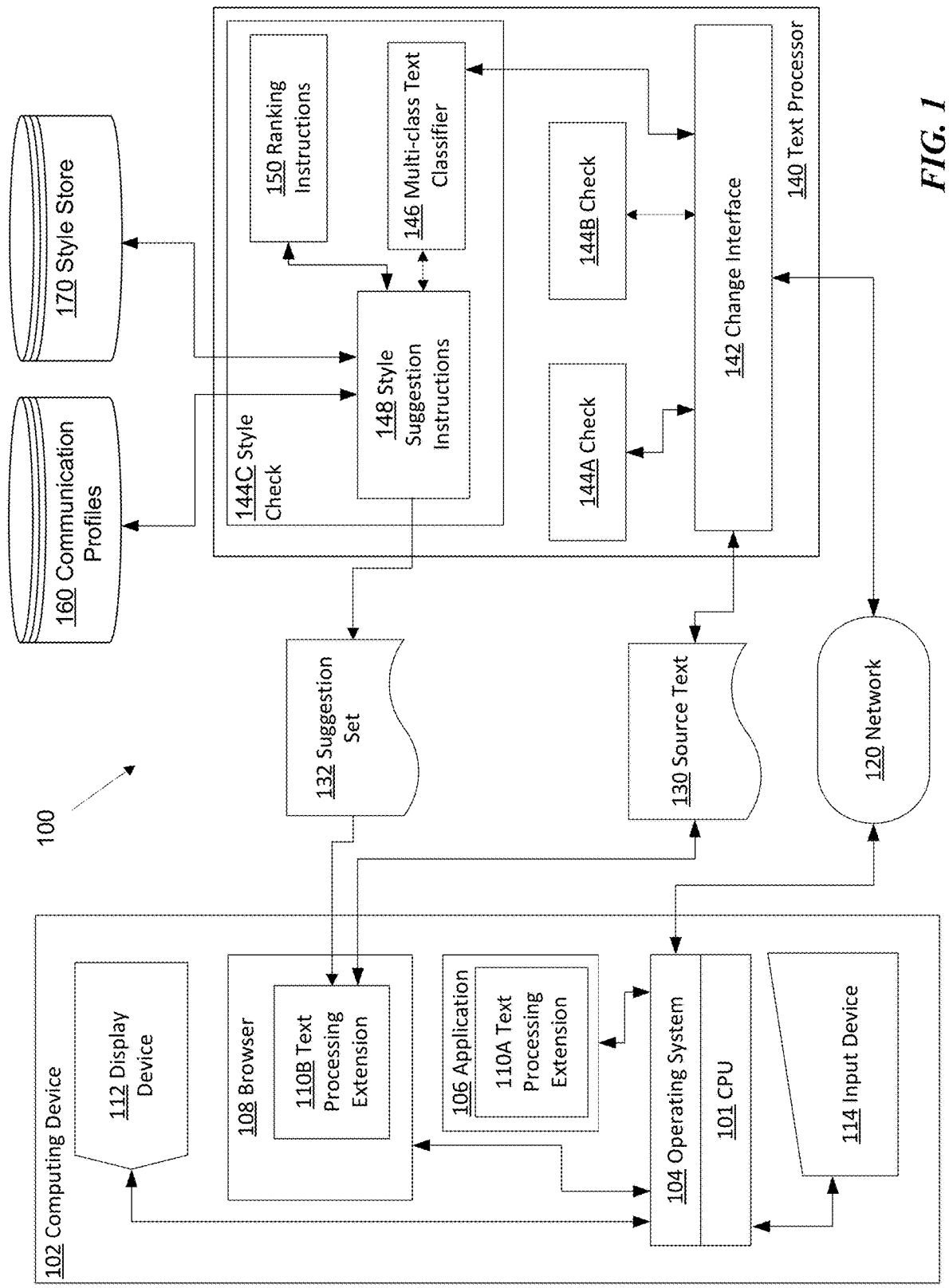
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. General Overview
2. Structural & Functional Overview
3. Implementation Example—Hardware Overview

1. General Overview

In an embodiment, a computer-implemented process is programmed to detect a target audience of text that is being drafted and to suggest one or more edits to substitute for the original text, the suggested edits being potentially more aligned with the target audience' preferred communication styles than the writer's original text. Suggested edits may comprise edits to words, phrases, clauses, sentences, multi-sentences, or paragraphs. Suggested edits are determined based on a process comprising determining the communication styles of the writer's original text, accessing a communication profile of the target audience, comparing the communication styles of the writer's original text with the preferred communication styles in the communication profile, and generating the suggested edits based on the comparison so that the writer's text incorporating these suggested edits are more consistent with the target audience's preferred communication styles. The suggested edits can be ranked and filtered based on the communication profile of the target audience to result in suggesting a manageable set of edits which are also prioritized based on the target audience's communication preferences.

With this approach, adding specially chosen content to existing content can change the effectiveness of the communication with the target audience via text while preserving the meaning of the text. Unlike prior approaches, in an embodiment, the process is programmed to artificially understand the intent of the original text and the communication preferences of the target audience as a basis of suggesting other content to add. Furthermore, embodiments may interoperate with a visual or graphical user interface that is programmed to enable users to see the high-level summary of the target audience's communication profile, what the changes to the text will be, how these changes match the target audience's communication preferences, and whether they want these changes before they engage with the suggested edits.

In an embodiment, the disclosure provides a computer-implemented method executed at a first computer and comprising: programmatically receiving a digital electronic object, the digital electronic object comprising a source text that is directed to a target audience and that was composed at a second computer; determining, based on a communication profile of the target audience, a style value specifying a particular communication style from among a plurality of different communication styles; evaluating the source text using a trained machine-learning model, and receiving a classification output from the machine-learning model comprising a modified text based on the source text, the modified text having been classified using the particular communication style specified in the style value; generating an output set of suggested edits to the source text based on comparing the classification output to the source text; and transmitting the output set of suggested edits to the second computer.

In some embodiments, the trained machine-learning model comprises a multi-class text classifier. As an example and not by way of limitation, the multi-class text classifier comprises a FASTTEXT classifier. The machine learning model may be any of: a plurality of text classifiers coupled as an ensemble; a plurality of targeted rules that are programmed to find relevant words and coupled to a classifier to approve or reject whether an instance of a word is correct.

In some embodiments, the computer-implemented method further comprises generating the communication profile for the target audience based on communication preferences associated with the target audience. In one feature, the target audience comprises a single person. In another feature, the target audience comprises a group of people. In an embodiment, generating the communication profile comprises calculating, based on the communication preferences, a plurality of style values for the plurality of different communication styles, respectively. In one feature, the communication preferences are specified by the target audience. In another feature, the communication preferences are determined based on an analysis of historical communications associated with the target audience. In some embodiments, the plurality of different communication styles comprise one or more of formality, tone, brevity, clarity, conciseness, correctness, transparency, or positivity.

In some embodiments, the computer-implemented method further comprises accessing the communication profile of the target audience from a digital database comprising a plurality of communication profiles. In some embodiments, generating the output set of suggested edits to the source text is further based on a location associated with the target audience.

In some embodiments, the computer-implemented method further comprises, before the transmitting, ranking the output set of suggested edits based on a ranking criterion. In some embodiments, the computer-implemented method further comprises, before the transmitting, ranking the output set of suggested edits based on the communication profile of the target audience.

In some embodiments, the computer-implemented method further comprises the first computer executing a text processor that is communicatively coupled to a text processing extension that is executed at the second computer; programmatically receiving the digital electronic object comprising the source text via a message initiated at the text processing extension and transmitted to the text processor; and the text processing extension executing in association with an application program that is executing at the second computer, the text processing extension being programmed to automatically detect a change in a text entry window of the application program and, in response, to initiate the message.

In some embodiments, the computer-implemented method further comprises the first computer executing a text processor that is communicatively coupled to a text processing extension that is executed at the second computer; programmatically receiving the digital electronic object comprising the source text via a message initiated at the text processing extension and transmitted to the text processor; and the text processor executing in association with a browser that is executing at the second computer, the text processing extension being programmed to automatically detect a change in a text entry widget of the browser and, in response, to initiate the message.

2. Structural & Functional Overview

FIG. 1 illustrates a distributed computer system showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and all the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In the example of FIG. 1, a computing device 102 is communicatively coupled via a network 120 to a text processor 140. In one embodiment, computing device 102 comprises a client-type computing device such as a personal computer, laptop computer, tablet computer, smartphone, or notebook computer. For purposes of illustrating a clear example, a single computing device 102, network 120, and text processor 140 are shown in FIG. 1, but practical embodiments may include thousands to millions of computing devices 102 distributed over a wide geographic area or over the globe, and hundreds to thousands of instances of text processor 140 to serve requests and computing requirements of the computing devices.

Computing device 102 comprises, in one embodiment, a central processing unit (CPU) 101 coupled via a bus to a display device 112 and an input device 114. In some embodiments display device 112 and input device 114 are integrated, for example, using a touch-sensitive screen to implement a soft keyboard. CPU 101 hosts operating system 104, which may include a kernel, primitive services, a networking stack, and similar foundation elements implemented in software, firmware, or a combination. Operating system 104 supervises and manages one or more other programs. For purposes of illustrating a clear example, FIG. 1 shows the operating system 104 coupled to an application 106 and a browser 108, but other embodiments may have more or fewer apps or applications hosted on computing device 102.

At runtime, one or more of application 106 and browser 108 load, or are installed with, a text processing extension 110A, 110B, which comprises executable instructions that are compatible with text processor 140 and may implement application-specific communication protocols to rapidly communicate text-related commands and data between the extension and the text processor. Text processing extensions 110A, 110B may be implemented as runtime libraries, browser plug-ins, browser extensions, or other means of adding external functionality to otherwise unrelated, third-party applications or software. The precise means of implementing a text processing extension 110A, 110B or to obtain input text is not critical provided that an extension is compatible with and can be functionally integrated with a host application 106 or browser 108.

In some embodiments, a text processing extension 110A may install as a stand-alone application that communicates programmatically with either or both of the operating system 104 and with an application 106. For example, in one implementation, text processing extension 110A executes independently of application 106 and programmatically calls services or APIs of operating system 104 to obtain the text that has been entered in or is being entered in input fields that the application manages. Accessibility services or accessibility APIs of the operating system 104 may be called for this purpose; for example, an embodiment can call an accessibility API that normally obtains input text from the application 106 and outputs speech to audibly speak the text to the user, but use the text obtained by the accessibility service in the processes that are described for FIG. 2 and other sections herein.

In some embodiments, each text processing extension 110A, 110B is linked, loaded with, or otherwise programmatically coupled to or with one or more of application 106 and browser 108 and, in this configuration, is capable of calling API calls, internal methods or functions, or other programmatic facilities of the application or browser. These calls or other invocations of methods or functions enable each text processing extension 110A, 110B to detect text that is entered in input fields, windows, or panels of application 106 or browser 108, instruct the application or browser to delete a character, word, sentence, or another unit of text, and instruct the application or browser to insert a character, word, sentence, or another unit of text.

Each of the text processing extensions 110A, 110B is programmed to interoperate with a host application 106 or browser 108 to detect the entry of text in a text entry function of the application or browser and/or changes in the entered text, to transmit changes in the text to text processor 140 for server-side checking and processing, to receive responsive data and commands from the text processor, and to execute presentation functions in cooperation with the host application or browser.

As one functional example, assume that browser 108 renders an HTML document that includes a text entry panel in which a user can enter free-form text describing a product or service. The text processing extension 110B is programmed to detect user selection of the text entry panel, the entry of text or changes in the text within the panel, and to transmit all such text changes to text processor 140. In an embodiment, each text processing extension 110A, 110B is programmed to buffer or accumulate text changes locally over a programmable period, for example, five seconds, and to transmit the accumulated changes over that period as a batch to text processor 140. Buffering or accumulation in this manner, while not required, may improve performance by reducing network messaging roundtrips and reducing the likelihood that text changes could be lost due to packet drops in the networking infrastructure.

A commercial example of text processing extensions 110A, 110B is the GRAMMARLY extension, commercially available from Grammarly, Inc. of Kyiv, Ukraine.

Network 120 broadly represents one or more local area networks, wide area networks, campus networks, or internetworks in any combination, using any of terrestrial or satellite, wired, or wireless network links.

In an embodiment, the text processor 140 comprises one or more server computers, workstations, computing clusters, and/or virtual machine processor instances, with or without network-attached storage or directly attached storage, located in any of enterprise premises, private datacenter, public datacenter and/or cloud computing center. Text processor 140 broadly represents a programmed server computer having processing throughput and storage capacity sufficient to communicate concurrently with thousands to millions of computing devices 102 associated with different users or accounts. For purposes of illustrating a clear example and focusing on innovations that are relevant to the appended claims, FIG. 1 omits basic hardware elements of text processor 140 such as a CPU, bus, I/O devices, main memory, and the like, illustrating instead an example software architecture for functional elements that execute on the hardware elements. Text processor 140 also may include foundational software elements not shown in FIG. 1, such as an operating system consisting of a kernel and primitive services, system services, a networking stack, an HTTP server, other presentation software, and other application software. Thus, text processor 140 may execute at a first computer, and text processing extensions 110A, 110B may execute at a second computer.

In an embodiment, text processor 140 comprises a change interface 142 that is coupled indirectly to network 120. Change interface 142 is programmed to receive the text changes that text processing extensions 110A, 110B transmit to text processor 140, and to distribute the text changes to a plurality of different checks 144A, 144B, 144C. To illustrate a clear example, source text 130 of FIG. 1 represents one or more text changes that text processing extension 110B transmits to change interface 142. In an embodiment, change interface 142 is programmed to distribute each and every text change arriving from a text processing extension 110A, 110B to all of the checks 144A, 144B, 144C, which execute in parallel and/or in independent threads.

Thus, in one embodiment, the text processor 140 may be programmed to programmatically receive a digital electronic object comprising a source text, a message with the source text, an application protocol message with the source text, an HTTP POST request with the source text as a payload, or using other programmed mechanics. In various embodiments, the first computer executes a text processor 140 that is communicatively coupled to a text processing extension that is executed at the second computer and programmatically receives the digital electronic object comprising the source text via a message initiated at the text processing extension and transmitted to the text processor 140; and/or the text processing extension executes in association with an application program that is executing at the second computer, the text processing extension being programmed to automatically detect a change in a text entry window of the application program and, in response, to initiate the message; and/or the text processor 140 executes in association with browser that is executing at the second computer, the text processing extension being programmed to automatically detect a change in a text entry widget of the browser and, in response, to initiate the message.

Each of the checks 144A, 144B, 144C is programmed to execute a different form of checking or processing of a text change that has arrived. Example functions that checks 144A, 144B could implement include grammar checking, tone detection, and translation. In an embodiment, check 144C is programmed as a style check, and therefore it is also denoted "style check 144C" in this description. In an embodiment, style check 144C comprises a multi-class text classifier 146 coupled to style suggestion instructions 148, which are coupled to ranking instructions 150; however, other machine-learning models can be used. For example, an embodiment may use a number of individual text classifiers ensembled together, or targeted rules may be programmed to find relevant words and then coupled to a classifier to approve or reject whether the instance of a word is correct, thus using a coarse rule followed by machine-learning based filtering.

In an embodiment, style check 144C is coupled to or can access, one or more communication profiles 160 and a style store 170, either of which may be integrated with text processor 140 or implemented as separate storage. In an embodiment, communication profiles 160 are stored in a database, flat file system, object store, or another digital data repository. Communication profiles 160 comprise a large number of communication profiles associated with different people, group, or organizations. The communication profiles comprise digitally stored data specifying preferred styles of communicating an account, user, person, group, or organization.

In an embodiment, each of the communication profiles 160 can comprise a database record, JSON blob, or other data structure that associates an account identifier or user identifier with one or more style values. Each account identifier or user identifier can correspond to an email address or other identifier of an account, a person, a group of people, a distribution list, or an entity or organization. Each communication style can comprise a value specifying an attribute of a written text or other communication that can be recognized by readers and capable of machine application. For example, one communication style can be "conciseness" and its corresponding style value can be a number between 0 and 1 with 0 indicating the least conciseness while 1 indicating the most conciseness. Other examples of communication style values or attributes include length or brevity, formal or informal, direct or indirect. In an evaluation stage of executing the system of FIG. 1, each of the communication style values can be associated with executing a different check 144A, 144B; for example, a communication style value specifying brevity can be associated with executing check 144A, which could be programmed as a "conciseness" check.

Furthermore, each of the communication profiles 160 can include one or more values that associate or link a particular profile to a different one or more accounts or users. For example, a record specifying a communication profile for the account "ben@domain.com" could include one or more values for "mary@domain.com" and "john@otherdomain.com" because the accounts "mary@domain.com" and "john@otherdomain.com" have communicated with "ben@domain.com" in the past or are in the same organization or entity. As described herein in other sections, associating an account in a communications profile with other accounts provides a basis for a programmed process to infer a target recipient and its profile when a communication is composed.

In an embodiment, style store 170 comprises a database, flat file system, object store, or another digital data repository that stores a large number of textual suggestions of words, clauses, phrases, sentences, multi-sentences, or paragraphs, in association with style values or tags that specify a style of communication, text, or document in which the suggestions could be substituted. Thus, style check 144C and/or text processor 140 may be programmed for evaluating each source text using a trained multi-class text classifier 146 machine-learning model and receiving a classification output from the multi-class text classifier 146 that classifies each source text as a particular class of style among a plurality of possible classes of styles.

Figure 2:
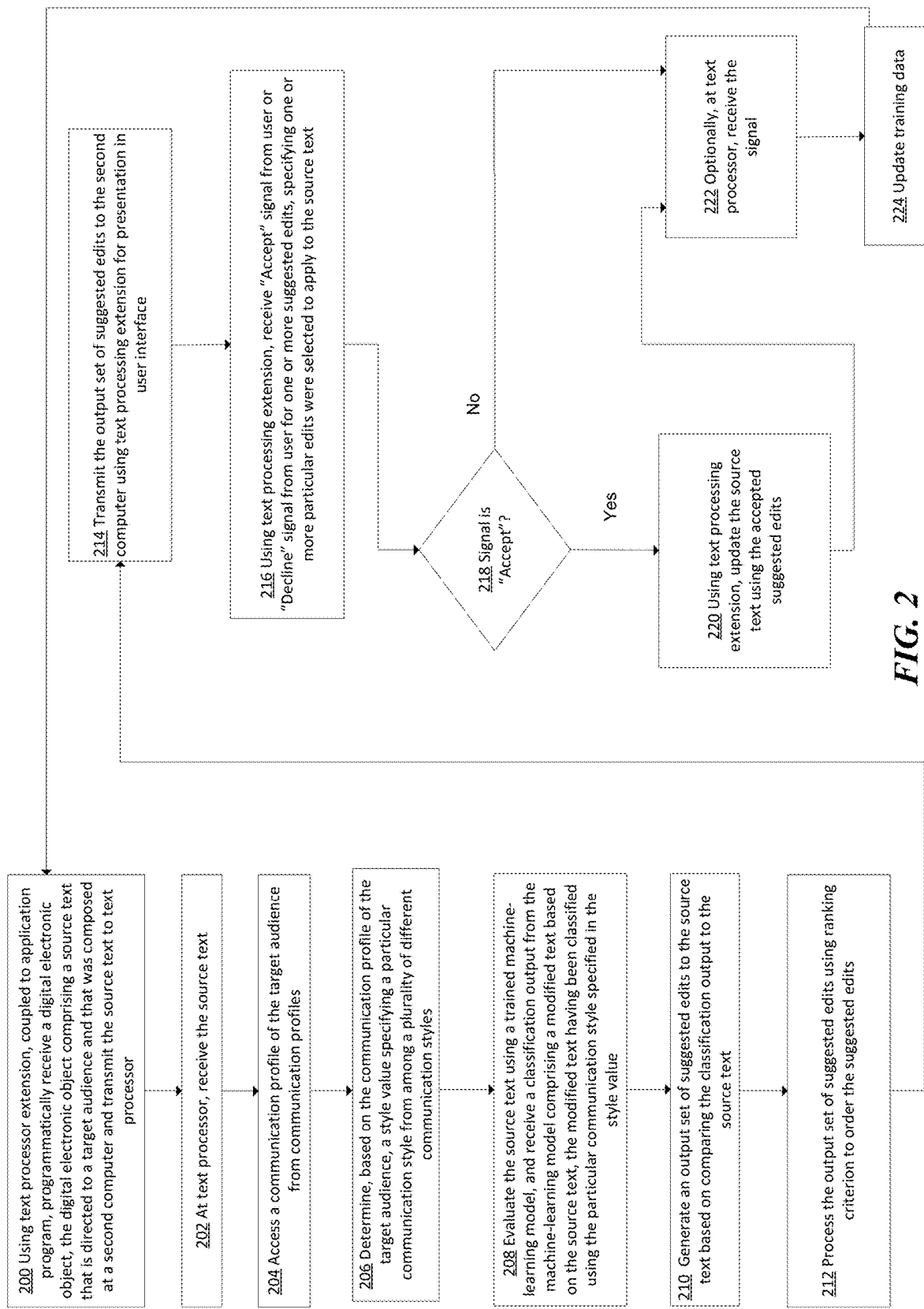
FIG. 2 illustrates a computer-implemented process of classifying a source text, determining style suggestions, and presenting the style suggestions, in one embodiment.

As further described herein for FIG. 2, in an embodiment, style suggestion instructions 148 are programmed, in part, to output a suggestion set 132 to transmit to text processing extension 110B.

FIG. 2 illustrates a computer-implemented process of classifying a source text, determining style suggestions, and presenting the style suggestions, in one embodiment. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object, or sub-step that would be needed to program every aspect of a working program, but are provided at the same functional level of illustration that is normally used at the high level of skill in this art to communicate the basis of developing working programs. Portions of the process shown in FIG. 2 can be programmed for execution by text processing extensions 110A, 110B, and style check 144C.

At step 200 of FIG. 2, in an embodiment, using a text processing extension coupled to an application program or browser, the process programmatically receives a digital electronic object, the digital electronic object comprising a source text that is directed to a target audience and that was composed at a second computer and transmit the source text to text processor. For example, as described for FIG. 1, each text processing extension 110A, 110B is programmed to transmit any change in the text to text processor 140. Thus, invocation of the process of FIG. 2 occurs in response to a user drafting text in application 106 (FIG. 1) or browser 108, based upon a text processing extension 110A, 110B detecting a change in source text 130 entered at the application or browser and transmitting the source text to change interface 142 of text processor 140 for evaluation using checks 144A, 144B, 144C.

At this stage, the process of FIG. 2 is programmed to identify which communication profile to access. In some embodiments, a user or account can explicitly specify the target audience with an identifier in the application program coupled to the text processing extension, for example, by inputting an email address in a recipient list when composing an email. The text processing extension can be programmed to call an API of the email client, inspect browser HTML elements, or use screen-scraping techniques to identify the email address. The process can then identify which communication profile to access based on the identifier of the target audience. In some embodiments, the process is programmed to infer the exact identity of the target audience based on the initial written text that is received. For example, the user may start typing "hi, Ben" in the email and one of the text processing extensions 110A, 110B transmits the typed text to style check 144C. Based on the received text, the process of FIG. 2 is programmed to determine that "Ben" is the target audience, query digitally stored communication profiles, receive a result set of account identifiers for communication profiles that are associated with the present user account and linked to accounts containing "Ben", and thereby infer which Ben the user intends to communication with. The user may be asked to confirm, for example, whether they are writing an email to "Ben Smith" in the same domain as the user or a different "Ben Smith" that also is linked in a communication profile. In response to input specifying a confirmation of the target recipient, the process of FIG. 2 is programmed to generate and cause displaying a prompt specifying whether the user wants to personalize the email to the confirmed person. In response to input specifying a confirmation to personalize, the process is programmed to access the communication profile of "Ben Smith" and identify a particular preferred communication style of "Ben Smith" that is stored in the profile.

At step 202, at the text processor, the source text is received. In some embodiments, the text processor 140 is implemented as a back-end server and is programmed to distribute the source text to a plurality of modules that are programmed to execute multiple types of checks on the text, and the process of FIG. 2 is implemented as one of the checks. For example, source text 130 is received at style check 144C via change interface 142.

At step 204, the process is programmed to access a communication profile of the target audience. As an example and not by way of limitation, step 204 can be programmed to access a particular communication among communication profiles 160 that matches the target audience of the communication. In this manner, a communication profile of the target audience directly provides a basis for automatic processing of a draft text to confirm to the preferred communication style of the target audience, and indirectly helps others to effectively communicate with the target audience. Consequently, with communication profiles 160, the process of FIG. 2 can automatically modify draft communications, and users can obtain personalized recommendations on how to write text in their communications depending on the target audience with which they communicate.

In some embodiments, the target audience or a communication in the process of FIG. 2 comprises a single person. Accordingly, accessing a communication profile of the target audience at step 204 will reflect the personal communication style of a target recipient. In some embodiments, the target audience of a communication in the process of FIG. 2 may comprise a group of people, for example, a distribution list, group, team or company. In this case, the communication profile of the target audience that is accessed at step 204 may be associated with an overall communication styles of the group.

In some embodiments, an individual user communication profile may be superseded or governed by the communication profile of a group, such as an entity or organization. Therefore, a communication profile accessed at step 204 can reflect both personal preferences and how people communicate within the group, or can implement enterprise values, norms, or other style requirements.

At step 206, the process of FIG. 2 is programmed to determine, based on the communication profile of the target audience, a style value specifying a particular communication style from among a plurality of different communication styles.

In some embodiments, the process of FIG. 2 is programmed to generate the communication profile for the target audience based on communication preferences associated with the target audience. In one embodiment, the communication preferences are specified by the target audience. For example, FIG. 2 can be programmed to implement a setup wizard with which the target audience is presented with a set of sentences and prompts to provide input specifying agreement or disagreement with a level of formality, detail, and directness in the sentences.

In another embodiment, communication preferences are determined automatically based on an analysis of historical communications associated with the target audience. For example, algorithms can be programmed to learn communication preferences of a target audience as it communicates. In one embodiment, generating the communication profile for the target audience comprises calculating, based on the communication preferences, a plurality of style values each associated with one of the different communication styles, respectively. As an example and not by way of limitation, the text processor 140 could set the style value as 0.8 for brevity. Accordingly, 0.8 would be used to determine how to change the text in a communication to the target audience.

When the target audience comprises a group or entity, the process may be programmed to generate the communication profile for the target audience via any of several approaches. In an embodiment, an authorized user on behalf of the group of people may specify the communication preferences for them. In another embodiment, the process may be programmed to combine individual communication profiles of the people in the group and add a common denominator that is shared by the people in the group. For example, step 206 could be programmed to determine the value 0.8 for brevity as previously described.

In an embodiment, the process of FIG. 2 is programmed first to detect that a suggested edit should be given, then selects one or more suggested edits to provide. In one approach for detection that a suggested edit should be given, style check 144C is programmed to form vectors that represent words, clauses, phrases, sentences, multi-sentences, or paragraphs and the surrounding context of source text 130, then searches for matching vectors in a labeled dataset that is digitally stored in the style store 170. The matching may use fuzzy similarity algorithms. In this manner, the text processor 140 may be programmed for dividing the source text into one or more source text units, and one example of the source text unit is a sentence. The dividing may use a parser or other programmed algorithm capable of inspecting natural-language text, identifying tokens or units of the text, identifying syntactic units, and so forth. Other units may be used in other embodiments including words, clauses, multi-sentence groups, paragraphs, and so forth.

Alternatively, a machine-learning model, structured as a text classifier, is trained on a large corpus of text and then used to evaluate a current text, outputting a classification of where to inject a suggested edit. For example, at step 208, the process is programmed to evaluate the source text using a trained machine-learning model, and receive a classification output from the machine-learning model comprising a modified text based on the source text, the modified text having been classified using the particular communication style specified in the style value. Referring to FIG. 1, source text 130 may be programmatically transmitted to the multi-class text classifier 146. In one embodiment, text classifier 146 implements a multi-class machine-learning model capable of outputting a plurality of different style values, each style value representing a style represented in the source text.

In one experimental implementation, text classifier 146 has been programmed to output, for each word, clause, phrase, sentence, multi-sentence, or paragraph, one or more style values for one or more of the communication styles of formality, tone, brevity, clarity, conciseness, correctness, transparency, and positivity. For example, for a particular sentence, the text classifier 146 may output a style value of 0.3 for formality, 0.4 for tone, 0.7 for conciseness, and 0.9 for correctness. In some embodiments, the style suggestion instructions 148 are programmed to generate style suggestions for fewer than all the styles that the text classifier 146 can output style values for. That is, the text classifier 146 may generate style values for certain styles as noted above, but style suggestions will not be offered for those styles. Whether style suggestions are offered for every style or style value depends on whether style store 170 has been loaded with style suggestions for every style.

In an embodiment, the process is programmed to map the classification output to an initial set of suggested edits of words, clauses, phrases, sentences, multi-sentences, or paragraphs, for example, in a plurality of candidate suggestions of words, clauses, phrases, sentences, multi-sentences, or paragraphs that are stored in a digital database. The mapping is based on the style values for different communication styles in the communication profile of the target audience. The initial set of suggested edits are more aligned with the style values in the communication profile of the target audience, as compared to the source text. Mapping the classification output to the initial set of suggested edits may include generating and submitting a query to style store 170 to select a result set of all stored words, clauses, phrases, sentences, multi-sentences, or paragraphs having style values that match the style values in the communication profile of the target audience. The machine-learning model further generates the modified text as part of the classification output based on the initial set of suggested edits.

In an embodiment, multi-class text classifier 146 may be programmed using the FASTTEXT model library authored by Facebook, Inc. In experimentation, the inventors determined that FASTTEXT, as supplied by FACEBOOK, does not generalize well without loss of precision when previously unseen labels are processed. In one experiment, FASTTEXT was integrated into a working implementation via these steps:

1. Manually author a small set of target-like sentences.
2. Use Universal Sentence Encoder to find semantically related sentences from a large random text corpus.
3. Perform human annotation to validate the selected sentences in being truthful to the definition of target style.
4. Use the validated data as the training dataset for the FASTTEXT classifier.

In another experiment, acceptable results were obtained using FASTTEXT embeddings as a metric of semantic distance between training sentences and user-input sentences under evaluation. Various sources of data for training were evaluated, such as news headlines as a substitute for sentences indicating styles, and ultimately a training dataset of specific style samples was manually prepared and input. As an alternative to FASTTEXT, a very deep convolutional neural network (VDCNN) can be used for training the machine-learning model. Experimental implementations also have used embedding of sentences with multiple feed-forward layers in a CNN. Further information about FASTTEXT including documentation is published online at the time of this writing at the website "fasttext.cc", which is accessible using a browser via the protocol identifier "https://".

Style store 170 digitally stores a plurality of different words, clauses, phrases, sentences, multi-sentences, or paragraphs, each stored in association with one or more style values corresponding to one or more of the communication styles that text classifier 146 can output. Style store 170 may use relational database tables, non-relational tables, flat files, or other forms of digital data storage to store sentences, clauses, or phrases with style values and their corresponding communication styles. In some embodiments, the words, clauses, phrases, sentences, multi-sentences, or paragraphs are manually prepared and manually labeled. For example, analytical linguists or copywriters can draft high-quality style suggestions for storing in style store 170.

Additionally or alternatively, words, clauses, phrases, sentences, multi-sentences, or paragraphs may be synthesized, or generated programmatically, under stored program control by using a sentence similarity processor to receive an input and to generate output synthetic data for style store 170. For example, text semantic similarity can be processed using open-source software available from GOOGLE using TENSORFLOW HUB and DATAFLOW. Furthermore, similar programmatic techniques may be used to synthesize a plurality of words, clauses, phrases, sentences, multi-sentences, or paragraphs to supplement a training dataset with which the text classifier 146 is trained.

Referring again to FIG. 2, at step 210, the process is programmed to generate an output set of suggested edits to the source text based on comparing the classification output to the source text. As an example and not by way of limitation, the process is programmed to compare the modified text to the source text to generate the output set of suggested edits. For instance, the source text may be "I will be sure to finish the project by tomorrow" and the modified text may be "I will finish the project by tomorrow." Accordingly, the suggested edit is removing "be sure to". Alternatively, the process may be programmed to directly use the initial set of suggested edits mapped from the classification output, as described at step 208.

In some embodiments, generating the output set of suggested edits to the source text is further based on a location associated with the target audience. As an example and not by way of limitation, the process may be programmed to internalize around cultural sensitivity when generating the output set of suggested edits. For instance, a positive tone may be more important for a target audience in Italy whereas a concise communication may be more important for a target audience in New York City. As another example and not by way of limitation, time zones may also matter for effective communication.

However, the output set of suggested edits may contain too many suggested edits to present in a user interface of the application 106 or browser 108 (FIG. 1). Therefore, in an embodiment, at step 212, the process is programmed to process the output set of suggested edits using ranking criterion to order the suggested edits so that the user sees the most important or top-ranked suggested edits first.

The ranking instructions 150 may be programmed to rank the output set of suggested edits according to any useful ranking criterion. In one feature, the ranking instructions 150 rank the output set of suggested edits based on the communication profile of the target audience. For example, if the target audience specified a strong preference in their communication profile that the communication to them should be informal, direct, and brief, the top ranked suggested edits would be those related to formality, directness, and brevity. As a result, the user can tackle these suggested edits as a priority. As another example, if the target audience specified a strong preference in their communication profile that the communication to them should be clear, the top ranked suggested edits would be those related to clarify, for example, a suggested edit of using a bullet list in the text because that will be more effective at delivering the relevant information to the target audience. For both the two above examples, a suggested edit of adding a comma that is missing in the source text may be not as important. In some embodiments, a threshold may be predetermined to evaluate whether the target audience has a strong preference for a particular communication style. For example, the threshold can be predetermined to be 5 and the target audience may be asked to use 0 to 10 to indicate the importance of a positive tone to them. If the target audience indicates the importance of a positive tone is 9, the target audience has a strong preference for that.

Other ranking criteria may include, but not limited to, similarity to a source text unit, dissimilarity, popularity across a community of users, or other criteria. As an example and not by way of limitation, in one ranking approach, the process is programmed to order the output set of suggested edits in inverse order of similarity to the source text 130. Ordering in inverse order of similarity can avoid presenting, to the user, a suggested edit that is too similar to the source text 130. To support this step, in an embodiment, the initial set of suggested edits obtained at step 208 can be submitted in real-time to a similarity processor to receive, in return, a similarity value for each suggested edit that reflects a degree of similarity to the source text 130. Or, ranking instructions 150 may be programmed to calculate, in real-time, a set similarity value between n-grams that are present in source text 130 and each suggested edit; the resulting set of similarity values may be programmatically provided to style suggestion instructions 148 for presentation, in suggestion set 132, in order of lowest similarity first. The set of suggested edits received from style store 170 may comprise multiple similar variants. Examples include "honestly speaking" and "frankly speaking".

In an embodiment, the effect of ranking instructions 150 when programmed as just described is to efficiently and effectively assist a user to edit the source text. To enhance this effect, ranking instructions 150 and/or style suggestion instructions 148 may be programmed using a clustering approach. For example, the suggested edits may be divided into a plurality of different groups by executing a clustering algorithm on them to result in grouping similar/related suggested edits. One cluster might include all suggested edits for the communication style of brevity, for example. Five or six clusters could be used, for example, and ranking instructions 150 and/or style suggestion instructions 148 may be programmed to conduct ranking as previously described and then select the highest-ranked suggested edit from each cluster successively to form a final set of suggested edits for output as the suggestion set 132.

In an embodiment, source text 130 may comprise a plurality of different words, clauses, phrases, sentences, multi-sentences, or paragraphs, each yielding different style values for different communication styles when the words, clauses, phrases, sentences, multi-sentences, or paragraphs are processed using the text classifier 146. In an embodiment, style suggestion instructions 148 are programmed to generate style suggestions only for a first style value of a first communication style that is initially output from text classifier 146 for a first word, clause, phrase, sentence, multi-sentence, or paragraph that is processed. Or, in an embodiment, the text classifier 146 is programmed to process all words, clauses, phrases, sentences, multi-sentences, or paragraphs that are present in source text 130, resulting in outputting a plurality of style values for a plurality of different communication styles; style suggestion instructions 148 may be programmed to select one communication style, using pseudo-random selection, from among all the communication styles and then select style suggestions only for the selected communication style.

At step 214, the process is programmed to transmit the output set of suggested edits to the second computer using text processing extension for presentation in user interface, for example, at a mobile computing device or another computing device that hosts or executes the text processing extension. Step 214 may include filtering or reducing the suggested edits to a reduced-size set, comprising an output set of suggested edits that are fewer in number. For example, the process can hide some of the suggested edits which may be irrelevant or may be repeating suggested edits. The process is programmed to filter the suggested edits, for example, to select only the top N suggested edits, based on the ranking. N may have a range of values depending on the display capabilities of the mobile computing device or another computing device that hosts or executes the text processing extension or depending upon the size of a graphical user interface panel, widget, or another visual element in which the suggested edits are to be displayed. In one embodiment, the range of N is from one to ten, but other ranges could be used in different embodiments and the specific value of N is not critical. In alternative embodiments, filtering can be executed before the ranking at step 212 or without ranking.

At this stage, the text processing extension, at the mobile computing device or another computing device, may be programmed to output a display of the set of suggested edits that have been received at the text processing extension via step 214. Output may comprise displaying a list of the suggested edits, instantiating a window, panel, or widget within a graphical user interface, or similar visual output. In some embodiments, the graphical user interface may categorize the suggested edits into different styles relevant to the target audience's preferred communication styles. The graphical user interface may further group the suggested edits based on the categorized styles. For example, clarity, conciseness, and brevity may be particularly important if the user wants to be more effective in communicating with a target audience. Accordingly, the graphical user interface may group together the windows, panels, or widgets comprising suggested edits of these three styles for efficient display to the user. The specific means of output is not critical provided that some means is provided to a user, of the mobile computing device or another computing device that hosts or executes the text processing extension, to view and consider whether to select one or more of the suggested edits.

In response to input at the second computer entering the source text, a text processing extension 110A, 110B is programmed to instantiate and cause displaying a sub-window that comprises a plurality of suggested edits. The text processing extensions 110A, 110B may be programmed to use system calls, function calls, method calls, or other programmatic means to instantiate sub-windows and cause communication profiles, suggested edits and data to be displayed. As an example and not by way of limitation, each of the suggested edits is output as a selectable hyperlink which, when selected, causes the text processing extension 110A, 110B to execute a call to delete the corresponding word, clause, phrase, sentence, multi-sentence, or paragraph in the source text and to insert the selected suggested edit.

At step 216, the process is programmed to receive, using the text processing extension, a signal from a user of the mobile computing device or the other computing device that hosts or executes the text processing extension to accept or decline one or more of the suggested edits, specifying that one or more particular suggested edits were selected to apply to the source text. For purposes of illustrating a clear example, step 216 and aspects of this description use the labels "Accept" and "Decline" to refer to input signals that could be received at step 216 or other steps, but these labels are merely examples and different implementations may use other internal values to identify different input.

At step 218, the process is programmed to determine whether an Accept signal or equivalent, was received as input. If step 218 is FALSE or NO, then control transfers to step 222 at which, optionally, the text processor 140 may receive the signal, for example, a Decline signal. At step 224, the process may be programmed to update training data, used to train the machine-learning model, based on the signal. Thus, steps 218, 222, and 224 may form a feedback loop by which training data is continuously updated based on user signals to indicate whether a particular suggested edit was correct, or useful, or not.

If step 218 is TRUE or YES, then at step 220, the process is programmed to update, using the text processing extension, the source text using the accepted suggested edits. Updating may comprise, for example, the text processing extension programmatically invoking an API call, internal method, or other programmed function, of the browser or app that the text processing extension extends, to insert the suggested edits into the source text, or to delete an original word, clause, phrase, sentence, multi-sentence, or paragraph and insert a suggested edit. Control then transfers to step 222, which is processed as described above.

The approaches disclosed herein provide efficient technical means for automatically updating a text that has been written using computer support. Unlike past approaches, the styles of a source text may be detected programmatically and then used to drive automatic machine selection of candidate suggested edits, with ranking if appropriate to eliminate candidate suggested edits that are irrelevant to the user or unimportant to the target audience the user is trying to communicate with. An ancillary benefit is that the styles of written communication may be improved to be more aligned with the target audience' preferred communication styles with computer assistance. The approaches herein provide efficient machine assistance to individuals who lack ability to clearly communicate their needs to the target audience in writing or have anxieties for communications especially if they don't know the target audience.

FIG. 3 illustrates an example of a graphical user interface that may be programmed to assist a user to set up a communication profile. As discussed before, a target audience's communication profile may be used for determining how to adjust the styles of the written text directed to the target audience. In FIG. 3, a graphical user interface (GUI) window 300 is displayed in the ordinary operation of an application program, browser, or other program executed at a second computer, such as a mobile computing device. In an embodiment, an application running with GUI window 300 provides a setup wizard which shows a series of questions to refine a user's communication preferences. For example, FIG. 3 shows that the second question out of three questions may be "on the receiving end at work, how long or short do you like information to be presented? 310" There may be three answers for the user to select. One answer may be "typically, I like things short and brief 320" Another answer may be "I prefer receiving information to be as descriptive as possible. 330" Another answer may be "I'm not really sure. 340" Once the user selects the answer, their communication profile is updated.

Figure 4:
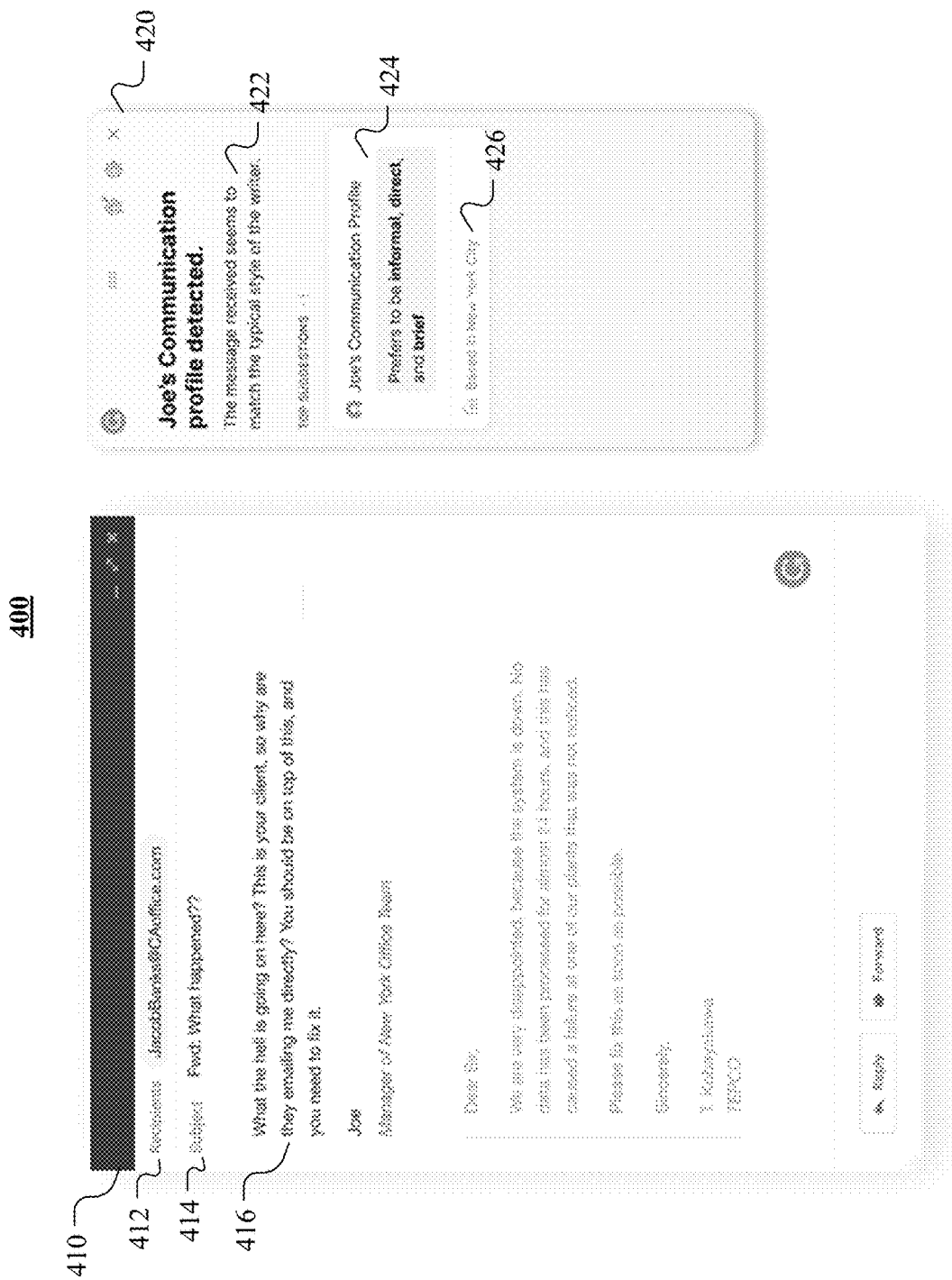
FIG. 4 illustrates an example of a graphical user interface that may be programmed to display a communication profile in conjunction with an application.

FIG. 4 illustrates an example of a graphical user interface that may be programmed to display a communication profile in conjunction with an application. In FIG. 4, a graphical user interface (GUI) window 400 is displayed in the ordinary operation of an application program, browser, or other program executed at a second computer, such as a mobile computing device for a user. In an embodiment, an application running with GUI window 400 provides email reading and composing functions and has instantiated a first sub-window 410. In FIG. 4, the first sub-window 410 includes a Recipients list 412, a subject 414 of "Fwd: What happened??" and the content 416 of the email received from Joe. In this example, Recipients list 412 specifies JacobBanks@CAoffice.com which is the email address of the user.

After the user received the email from Joe, the text processor 140 may contextualize the email by accessing Joe's communication profile and analyzing the email based on the communication profile to get more context on the communication from Joe's perspective. The text processor 140 may generate the context of the email. The text processor 140 may further generate the top suggestions regarding Joe's communication profile. As a result, the application running with GUI window 400 has also instantiated a second sub-window 420, which displays that Joe's communication profile is detected, the context 422 of the email from Joe, top suggestions 424, and Joe's location 426. In this example, context 422 specifies "the message received seems to match the typical style of the writer" and top suggestions 424 specifies "Joe prefers to be informal, direct, and brief." Such context and suggestions are examples of automated transformation of draft text or messages to correspond to communication style preferences of the target audience.

Figure 5A:
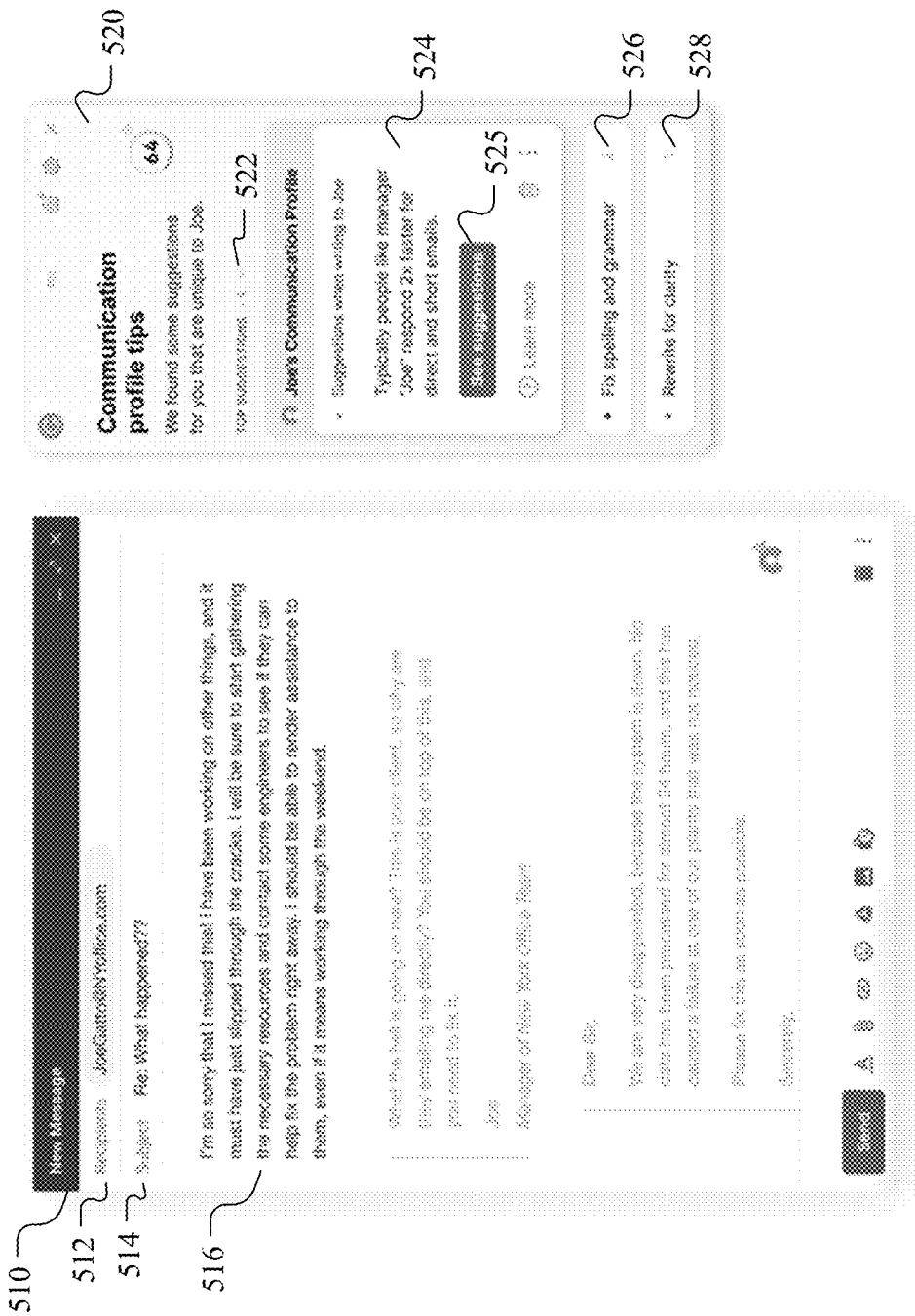
FIG. 5B illustrates an example of a graphical user interface that may be programmed to display style suggestions in conjunction with an application.
Figure 5B:
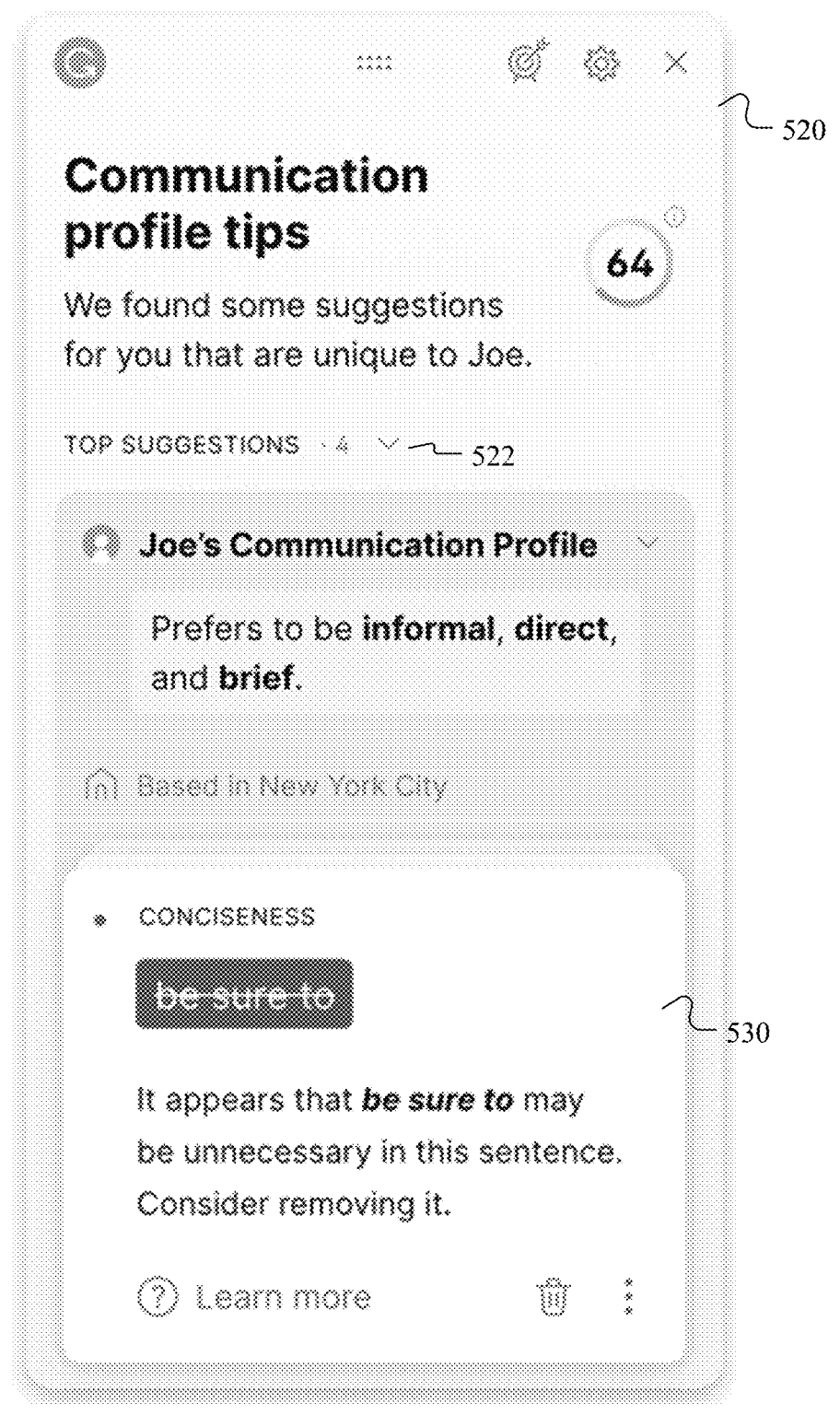

FIG. 5A, FIG. 5B each illustrate an example of a graphical user interface that may be programmed to display suggested edits in conjunction with an application.

Referring first to FIG. 5A, an example graphical user interface is shown for displaying both an email client or composition window and communication profile tips. In FIG. 5A, a graphical user interface (GUI) window 500 is displayed in the ordinary operation of an application program, browser, or other program executed at a second computer, such as a mobile computing device. In an embodiment, an application running with GUI window 500 provides email composing functions and has instantiated a first sub-window 510 which shows an email that was composed by the user. The first sub-window 510 includes a Recipients list 512, a subject 514 of "Re: What happened??" in this example, and the content 516 of the composed email. In this example, Recipients list 512 specifies JoeGatto@NYoffice.com which is Joe's email address.

Further, in the example, a user or account is identified via JacobBanks@CAoffice.com. In this example, after the specified account received the email from Joe as illustrated in FIG. 4, the user composed an email to reply to Joe. The text processor 140 may analyze the written text in the composed email and generate communication profile tips based on Joe's communication profile. As a result, the application running with GUI window 500 has also instantiated a second sub-window 520 displaying communication profile tips. The communication profile tips include top suggestions 522 which includes suggestions when writing to Joe 524, suggestions to fix spelling and grammar 526, and suggestions to rewrite for clarity 528. As an example, one top suggestion may be "typically people like manager 'Joe' respond 2× faster for direct and short emails." The user may click on "see suggestions" 525 to see detailed suggestions when writing to Joe.

FIG. 5B illustrates an example of the graphical user interface displaying a conciseness suggestion. After the user selects "see suggestions" 525, the second sub-window 520 displays a suggestion regarding conciseness 530 as to remove "be sure to." The suggestion 530 further states the reason for such change as "it appears that BE SURE TO may be unnecessary in this sentence. Consider removing it."

The disclosure has described embodiments that can be programmed for automatically adding specially chosen content to existing content to match a communication style preferred by a target audience and/or to change the effectiveness of the communication with the target audience via text while preserving the meaning of the text. Unlike prior approaches, embodiments are programmed to artificially understand the intent of the original text and the communication preferences of the target audience as a basis of suggesting other content to add. Furthermore, embodiments may interoperate with a visual or graphical user interface that is programmed to enable users to see the high-level summary of the target audience's communication profile, what the changes to the text will be, how these changes match the target audience's communication preferences, and whether they want these changes before they engage with the suggested edits.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field-programmable gate array (FPGA) that is persistently programmed to perform the techniques, or may include at least one general-purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
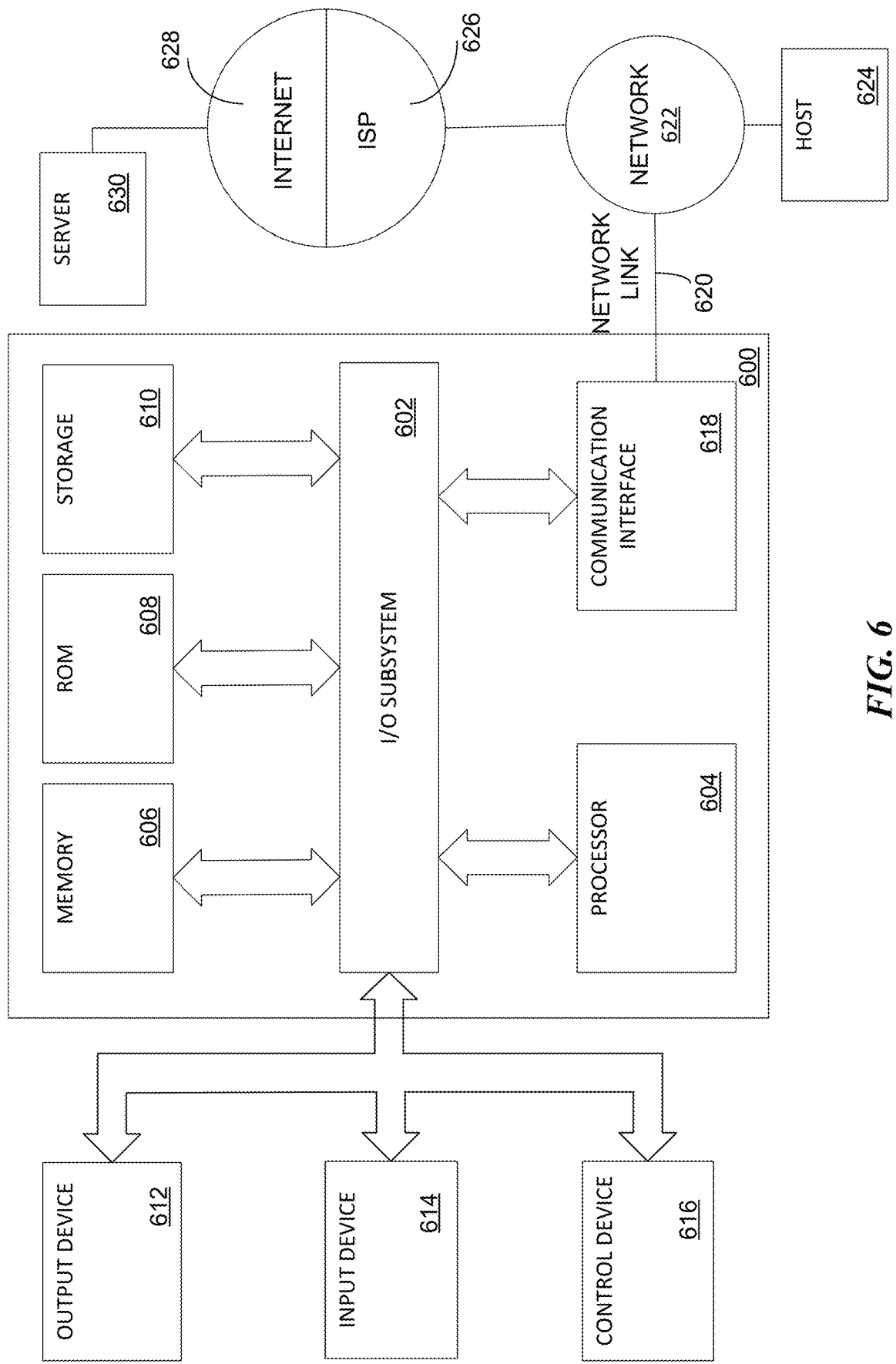
FIG. 6 illustrates a computer system with which one embodiment could be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanisms for communicating information and/or instructions between the components of the computer system 600 over electronic signal paths. The I/O subsystem 602 may include an I/O controller, a memory controller, and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or another dynamic storage device. Memory 606 also may be used for storing temporary variables or other intermediate information during the execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read-only memory (ROM) 608 or other static storage devices coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disks such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat-file system, or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include another type (s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators, or servos.

At least one input device 614 is coupled to I/O subsystem 602 for communicating signals, data, command selections, or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (for example, x) and a second axis (for example, y), that allows the device to specify positions in a plane. Another type of input device is a wired, wireless, or optical control device such as a joystick, wand, console, steering wheel, pedal, gearshift mechanism, or another type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware, and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid-state drive, flash drive, magnetic data storage medium, any optical or physical data storage medium, a memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 and place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to the bus of I/O subsystem 602. Communication interface 618 provides a two-way data communication coupling to a network link(s) 620 that are directly or indirectly connected to at least one communication network, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 622 broadly represents a local area network (LAN), wide-area network (WAN), campus network, internetwork, or any combination thereof. Communication interface 618 may comprise a LAN card to provide a data communication connection to a compatible LAN or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a worldwide packet data communication network represented as internet 628. A server computer 630 may be coupled to internet 628. Server 630 broadly represents any computer, data center, virtual machine, or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm, or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer, and data storage layer such as a relational database system using a structured query language (SQL) or no SQL, an object store, a graph database, a flat-file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed at a first computer and comprising:
   programmatically receiving a digital electronic object, the digital electronic object comprising a source text that is directed to a target audience and that was composed at a second computer;
   determining, based on a communication profile of the target audience, a style value specifying a particular communication style from among a plurality of different communication styles;
   evaluating the source text using a trained machine-learning model by dividing the source text into one or more source text units and inputting the one or more source text units into the machine-learning model;
   receiving a classification output from the machine-learning model comprising one or more source text style values specifying the particular communication style for the one or more source text units, respectively;
   generating, by the machine-learning model, a modified text based on applying one or more candidate edits to one or more of the source text units of the source text, the modified text having been classified using the particular communication style specified in the style value, wherein the one or more candidate edits are determined based on the style value and the one or more source text style values;
   generating an output set of suggested edits to the source text based on the one or more candidate edits;
   transmitting the output set of suggested edits to the second computer.

2. The computer-implemented method of claim 1, the trained machine-learning model comprising a multi-class text classifier.

3. The computer-implemented method of claim 1, further comprising generating the communication profile for the target audience based on communication preferences associated with the target audience.

4. The computer-implemented method of claim 3, further comprising generating the communication profile by calculating, based on the communication preferences, a plurality of style values for the plurality of different communication styles, respectively.

5. The computer-implemented method of claim 3, the communication preferences being specified by the target audience or being determined based on an analysis of historical communications associated with the target audience.

6. The computer-implemented method of claim 1, the target audience comprising a single person or a group of people.

7. The computer-implemented method of claim 1, the plurality of different communication styles comprising one or more of formality, tone, brevity, clarity, conciseness, correctness, transparency, or positivity.

8. The computer-implemented method of claim 1, further comprising, before the transmitting, ranking the output set of suggested edits based on a ranking criterion.

9. The computer-implemented method of claim 1, further comprising, before the transmitting, ranking the output set of suggested edits based on the communication profile of the target audience.

10. The computer-implemented method of claim 1, the trained machine-learning model comprising any of:
    a plurality of text classifiers coupled as an ensemble; or
    a plurality of targeted rules that are programmed to find relevant words and coupled to a classifier to approve or reject whether an instance of a word is correct.

11. The computer-implemented method of claim 1, further comprising:
    the first computer executing a text processor that is communicatively coupled to a text processing extension that is executed at the second computer;
    programmatically receiving the digital electronic object comprising the source text via a message initiated at the text processing extension and transmitted to the text processor;
    the text processing extension executing in association with an application program that is executing at the second computer, the text processing extension being programmed to automatically detect a change in a text entry window of the application program and, in response, to initiate the message.

12. The computer-implemented method of claim 1, further comprising:
    the first computer executing a text processor that is communicatively coupled to a text processing extension that is executed at the second computer;
    programmatically receiving the digital electronic object comprising the source text via a message initiated at the text processing extension and transmitted to the text processor;
    the text processor executing in association with a browser that is executing at the second computer, the text processing extension being programmed to automatically detect a change in a text entry widget of the browser and, in response, to initiate the message.

13. The computer-implemented method of claim 1, generating the output set of suggested edits to the source text being further based on a location associated with the target audience.

14. The computer-implemented method of claim 1, further comprising accessing the communication profile of the target audience from a digital database comprising a plurality of communication profiles.

15. One or more non-transitory computer-readable media storing one or more sequences of instructions which, when executed using a first computer, cause the first computer to execute:
  programmatically receiving a digital electronic object, the digital electronic object comprising a source text that is directed to a target audience and that was composed at a second computer;
  determining, based on a communication profile of the target audience, a style value specifying a particular communication style from among a plurality of different communication styles;
  evaluating the source text using a trained machine-learning model by dividing the source text into one or more source text units and inputting the one or more source text units into the machine-learning model;
  receiving a classification output from the machine-learning model comprising one or more source text style values specifying the particular communication style for the one or more source text units, respectively;
  generating, by the machine-learning model, a modified text based on applying one or more candidate edits to one or more of the source text units of the source text, the modified text having been classified using the particular communication style specified in the style value, wherein the one or more candidate edits are determined based on the style value and the one or more source text style values;
  generating an output set of suggested edits to the source text based on the one or more candidate edits;
  transmitting the output set of suggested edits to the second computer.

16. The one or more computer-readable media of claim 15, the trained machine-learning model comprising a multi-class text classifier.

17. The one or more computer-readable media of claim 15, further comprising sequences of instructions which when executed by the first computer cause, generating the communication profile for the target audience based on communication preferences associated with the target audience.

18. The one or more computer-readable media of claim 15, the target audience comprising a single person or a group of people.

19. The one or more computer-readable media of claim 15, the plurality of different communication styles comprising one or more of formality, tone, brevity, clarity, conciseness, correctness, transparency, or positivity.

20. A computing device programmed for text processing and comprising:
  one or more central processing units;
  one or more network interfaces that are configured to communicatively couple the one or more central processing units to a data communication network;
  electronic digital random access memory storing a plurality of sequences of stored program instructions that are organized as executable checks for checking a digitally stored source text that is received via the data communication network from a computing device that is executing a text processing extension, a style check among the executable checks comprising multi-class text classifier instructions coupled to style suggestion instructions, the style suggestion instructions being coupled to a digital phrase store;
  the multi-class text classifier instructions and style suggestion instructions being programmed to read the source text; determine, based on a communication profile of a target audience that the source text is directed to, a style value specifying a particular communication style from among a plurality of different communication styles; evaluate the source text using a trained machine-learning model by dividing the source text into one or more source text units and inputting the one or more source text units into the machine-learning model; receive a classification output from the machine-learning model comprising one or more source text style values specifying the particular communication style for the one or more source text units, respectively; generate, by the machine-learning model, a modified text based on applying one or more candidate edits to one or more of the source text units of the source text, the modified text having been classified using the particular communication style specified in the style value, wherein the one or more candidate edits are determined based on the style value and the one or more source text style values; generate an output set of suggested edits to the source text based on the one or more candidate edits; transmit the output set of suggested edits to the computing device via the data communication network.

* * * * *